US008109535B2

(12) United States Patent
Barbat et al.

(10) Patent No.: US 8,109,535 B2
(45) Date of Patent: Feb. 7, 2012

(54) SPORT UTILITY VEHICLE (SUV) FRAME ARCHITECTURE FOR IMPROVED VEHICLE-TO-VEHICLE COMPATIBILITY

(75) Inventors: Saeed D Barbat, Farmington Hills, MI (US); James C Cheng, Troy, MI (US); Raj Jayachandran, Canton, MI (US); Senthilkumar Mahadevan, Sterling Heights, MI (US)

(73) Assignee: Ford Global Technologies, Dearborn, MI (US)

( * ) Notice: Subject to any disclaimer, the term of this patent is extended or adjusted under 35 U.S.C. 154(b) by 2024 days.

(21) Appl. No.: 10/905,046

(22) Filed: Dec. 13, 2004

(65) Prior Publication Data

US 2006/0125226 A1 Jun. 15, 2006

(51) Int. Cl.
*B62D 21/15* (2006.01)
(52) U.S. Cl. ..................... 280/790; 180/311; 296/203.02
(58) Field of Classification Search ................... 280/781, 280/790; 180/311; 296/203.02, 203.04; 188/371
See application file for complete search history.

(56) References Cited

U.S. PATENT DOCUMENTS

| | | | | |
|---|---|---|---|---|
| 1,399,201 | A * | 12/1921 | Fekete et al. | 280/797 |
| 1,473,651 | A * | 11/1923 | Smith | 280/781 |
| 2,964,331 | A * | 12/1960 | Sherman | 280/790 |
| 2,965,414 | A * | 12/1960 | Engelhard | 296/35.1 |
| 3,819,224 | A * | 6/1974 | Casey et al. | 296/187.09 |
| 3,888,502 | A * | 6/1975 | Felzer et al. | 280/784 |
| 3,955,640 | A * | 5/1976 | Yamanaka | 180/271 |
| 4,440,435 | A * | 4/1984 | Norlin | 296/187.09 |
| 4,847,972 | A * | 7/1989 | Anderson et al. | 29/401.1 |
| 5,346,276 | A * | 9/1994 | Enning et al. | 296/203.02 |
| 5,876,078 | A * | 3/1999 | Miskech et al. | 293/133 |
| 6,152,521 | A * | 11/2000 | Hayashi et al. | 296/187.09 |
| 6,176,530 | B1 * | 1/2001 | Gollungberg | 293/133 |
| 6,416,118 | B1 * | 7/2002 | Schlusemann | 296/187.08 |
| 6,416,119 | B1 * | 7/2002 | Gericke et al. | 296/205 |
| 6,511,119 | B2 * | 1/2003 | Takase et al. | 296/187.09 |
| 6,598,933 | B2 * | 7/2003 | Taguchi et al. | 296/203.02 |
| 6,619,730 | B2 * | 9/2003 | Porner | 296/204 |
| 6,655,721 | B2 | 12/2003 | Hagen | |
| 6,681,489 | B1 * | 1/2004 | Fleming | 29/897.2 |
| 6,712,426 | B2 * | 3/2004 | Ritchie et al. | 296/187.09 |
| 6,764,118 | B2 * | 7/2004 | DePottey et al. | 293/118 |
| 6,793,274 | B2 * | 9/2004 | Riley et al. | 296/187.03 |
| 6,799,783 | B2 * | 10/2004 | Gollungberg et al. | 293/102 |
| 6,808,229 | B2 * | 10/2004 | Yamaguchi | 296/204 |
| 6,811,212 | B2 * | 11/2004 | Kasuga | 296/205 |
| 6,820,924 | B2 * | 11/2004 | Caliskan et al. | 296/187.03 |
| 6,889,617 | B2 * | 5/2005 | Taguchi | 105/392.5 |
| 6,942,262 | B2 * | 9/2005 | Glasgow et al. | 293/132 |
| 6,994,350 | B2 * | 2/2006 | Krajewski et al. | 296/187.03 |
| 6,994,379 | B2 * | 2/2006 | Zoellner | 285/285.1 |

(Continued)

*Primary Examiner* — Paul N Dickson
*Assistant Examiner* — Timothy Wilhelm
(74) *Attorney, Agent, or Firm* — Jerome R. Drouillard; Greg Brown

(57) ABSTRACT

According to one embodiment, the invention provides for a light truck including a frame with opposing longitudinal frame rails running along each side of the vehicle. The frame rails include at least a leading portion with vertical placement lowered and selected to substantially align with a passenger car energy management structure. In this embodiment, the vertical placement of the leading portion of the light truck frame rails is selected to direct impact energy to a passenger car longitudinal energy management structure, improving vehicle-to-vehicle compatibility in the event of a front longitudinal impact with a passenger car. The present invention also provides embodiments which increase the impact energy absorption capacity of a light truck by providing geometric softening of the frame rails and material softening of the frame rails.

17 Claims, 5 Drawing Sheets

U.S. PATENT DOCUMENTS

| | | |
|---|---|---|
| 7,021,686 B2 * | 4/2006 | Glasgow et al. ............... 293/132 |
| 7,114,587 B2 * | 10/2006 | Mori et al. ................... 180/68.3 |
| 7,219,954 B2 * | 5/2007 | Gomi et al. ............... 296/203.02 |
| 2003/0025358 A1 * | 2/2003 | Taguchi et al. ........... 296/203.02 |
| 2003/0107241 A1 * | 6/2003 | Ritchie et al. ................. 296/188 |
| 2004/0046403 A1 * | 3/2004 | DePottey et al. ............. 293/118 |
| 2004/0113443 A1 * | 6/2004 | Glasgow et al. ............... 293/132 |
| 2004/0148778 A1 * | 8/2004 | Fleming ....................... 29/897.2 |
| 2004/0189049 A1 * | 9/2004 | Krajewski et al. ....... 296/187.03 |
| 2004/0201256 A1 * | 10/2004 | Caliskan et al. ......... 296/187.08 |
| 2005/0028894 A1 * | 2/2005 | Hoffmann et al. ............. 148/417 |
| 2005/0029836 A1 * | 2/2005 | Caliskan et al. ......... 296/193.06 |
| 2005/0110285 A1 * | 5/2005 | Glasgow et al. ............... 293/133 |
| 2005/0280282 A1 * | 12/2005 | Ran ................................ 296/135 |
| 2006/0012193 A1 * | 1/2006 | Andersson .................... 293/102 |
| 2006/0113805 A1 * | 6/2006 | Wakefield ..................... 293/102 |
| 2006/0138764 A1 * | 6/2006 | Hagemann et al. ........... 280/781 |

* cited by examiner

SPORT UTILITY VEHICLE (SUV) FRAME ARCHITECTURE FOR IMPROVED VEHICLE-TO-VEHICLE COMPATIBILITY

PATENT FAMILY INFORMATION

This application claims the benefit of Provisional Application Ser. No. 60/547,522, filed Feb. 25, 2004.

FIELD OF INVENTION

This invention relates to light truck frame architecture, and more specifically to an improved light truck frame for directing impact energy to an energy management structure of a passenger car in the event of a front longitudinal impact event between a light truck and a passenger car, and for increasing energy absorption by the light truck frame in the event of a front longitudinal impact with a passenger car.

BACKGROUND OF INVENTION

As the popularity of sport utility vehicles (SUVs), pickup trucks and other light truck vehicles has grown over the years, the subject of impact compatibility between vehicles has attracted more attention. Historically, vehicles have been tested by driving the vehicle into a rigid fixed barrier. This has led to vehicles designed to protect the occupants within a striking vehicle in a frontal impact event with a similar vehicle. This approach is known as "self-protection". For instance, the dynamic crush lengths of vehicles were designed according to their masses to provide for "self-protection" against a frontal impact with a similar vehicle. This approach has lead to stiffer front ends for sport utility, pickup trucks and other light truck vehicles.

Empirical data show that vehicle-to-vehicle impact events often involve vehicles of different sizes. In a front longitudinal impact event between a passenger car and a larger light truck vehicle, such as sport utility vehicles (SUV) and pickup trucks (hereinafter collectively referred to as "light trucks"), a bumper-to-bumper "over-ride/under-ride" phenomenon may arise because of a geometric mismatch between the larger vehicle and the passenger car. Recent research has been aimed at addressing both "self-protection" and "partner protection" in an effort to make larger vehicles more compatible during impact events. The present invention seeks to address the issue of compatibility during a front longitudinal impact event between a light truck vehicle, such as an SUV or pickup type vehicle, and a passenger car.

SUMMARY OF INVENTION

According to one embodiment, the invention provides for a light truck including an improved frame to direct impact energy to a passenger car energy management structure. The improved frame structure includes opposing longitudinal frame rails running along each side of the vehicle. The frame rails each include at least a leading portion with vertical placement defined to substantially align with a passenger car longitudinal energy management structure. In this embodiment, the vertical placement of the leading portion of the light truck frame rail is selected to align with a passenger car longitudinal energy management structure, improving vehicle-to-vehicle compatibility between the vehicles in the event of a frontal longitudinal impact.

The present invention also provides embodiments to increase the energy absorption capacity of a light truck vehicle frame during an impact event. For vehicle-to-vehicle compatibility, it is desirable that each vehicle share the impact energy more evenly. Geometric softening and material softening embodiments are further provided in order to increase the capacity for impact energy absorption by the frame rails of light trucks.

Other advantages, as well as features and objects of the present invention will become apparent to the reader of this specification.

DETAILED DESCRIPTION

Incompatibility between passenger cars and light trucks during longitudinal impact events arises mainly due to differences with regard to mass, geometry and stiffness of the impacting vehicles. The present invention provides embodiments for reducing the likelihood of bumper-to-bumper over-ride/under-ride in the event of a light truck and passenger car front longitudinal impact, which impairs the conversion of impact energy.

Figure 1:
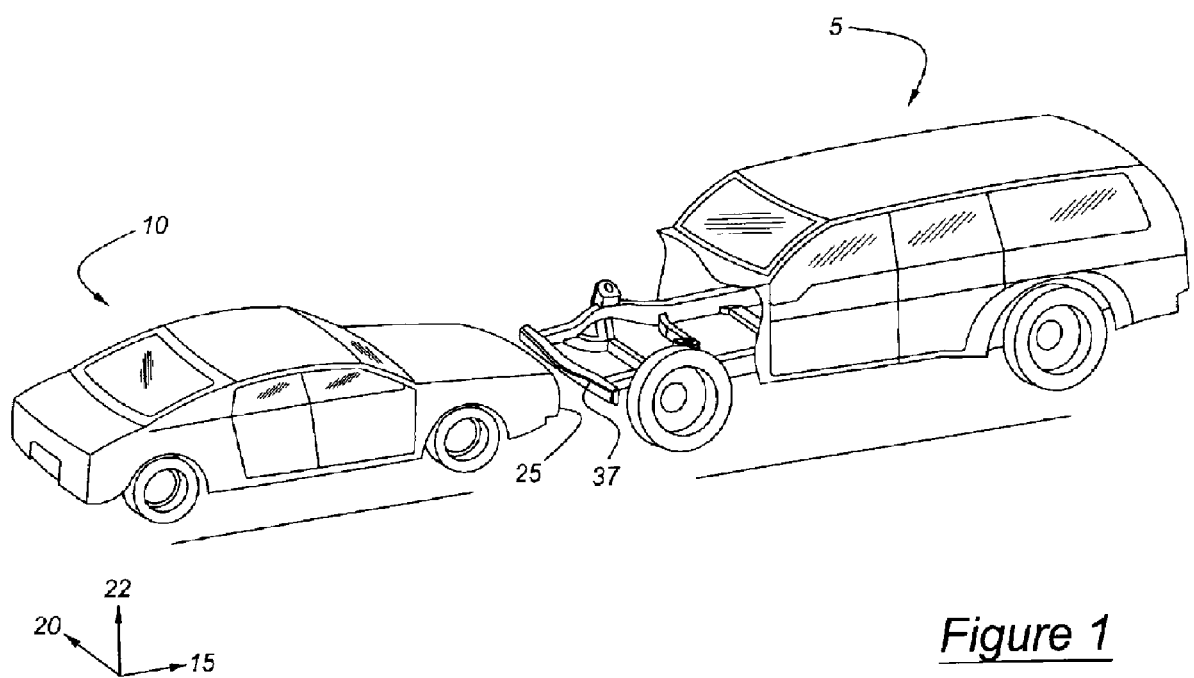
FIG. 1 is a perspective view of a front longitudinal impact event between a light truck and a passenger car.

FIG. 1 illustrates a front longitudinal impact event between a light truck, 5, and a passenger car, 10. The longitudinal vehicle direction 15, lateral vehicle direction 20, and vertical vehicle direction 22 are illustrated in this figure.

Figure 2:
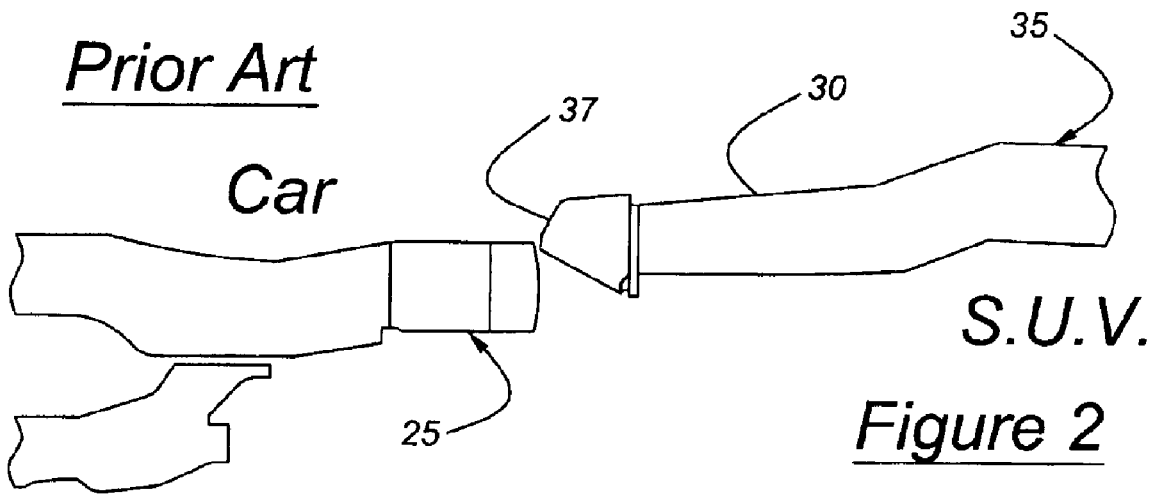
FIG. 2 is a lateral view of the alignment of a prior art light truck frame and a passenger car longitudinal energy management structure.

FIG. 2 is a lateral view illustrating a prior art light truck frame rail, 35, and bumper 37 as well as the geometry of a passenger car energy management structure 25. Passenger cars typically utilize one of two types of chassis construction, either a body-on-frame construction or a "unibody" construction. A body-on-frame construction typically involves a vehicle body mounted on a separate frame assembly. In contrast, a unibody construction may include side rails that are integral components of the floor pan. Each type of construction will include some form of passenger car energy management structure, 25, which is a structure intended to absorb energy in the event of a front longitudinal impact. In the example shown in FIG. 2, passenger car energy management structure 25 includes passenger car frame rails, but a variety of structures may be employed including a unibody type structure. The light truck frame rail 35 in this figure is a prior art sport utility vehicle frame rail. The alignment of the longitudinal elements of the passenger car energy management structure 25 and the leading portion 30 of the prior art light truck frame rail 35 are typically vertically offset with minimal vertical alignment. The straight longitudinal leading portion 30 of the prior art light truck frame rail 35 is substantially above the longitudinal components of the car energy management structure 25. In some front longitudinal impact events, the straight longitudinal leading portion 30 of the prior art light truck frame rail 35 may begin to over-ride the passenger car energy management structure 25.

Figure 3:
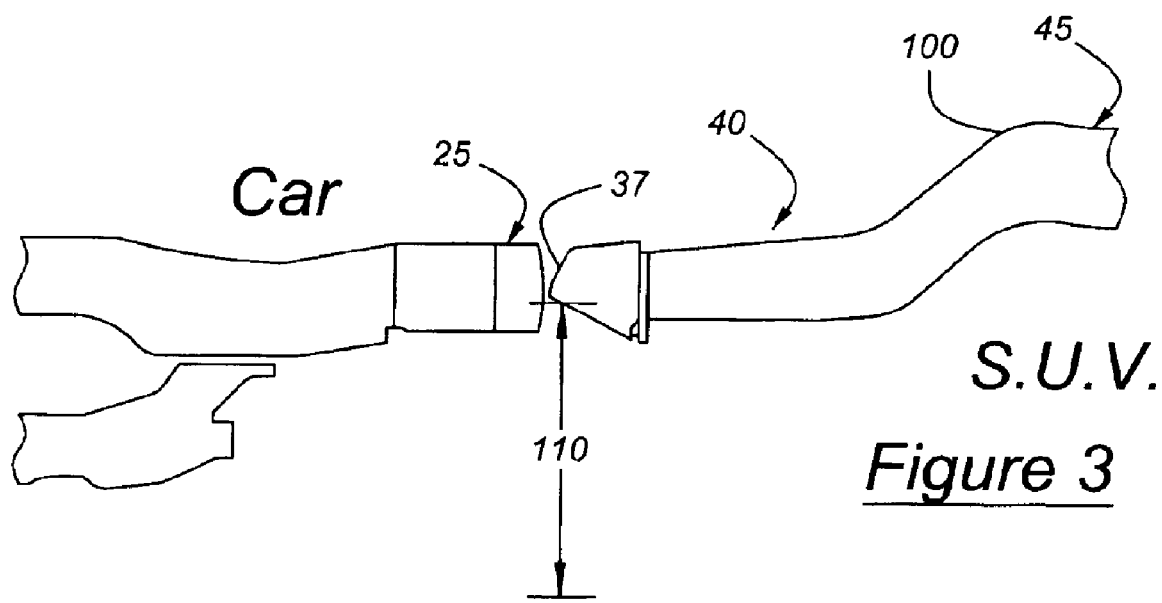
FIG. 3 is a lateral view of an embodiment of an improved light truck frame and a passenger car energy management structure.

FIG. 3 illustrates an embodiment of the present invention including an improved frame rail, 45, having geometry marked by a vertically aligned longitudinal leading portion 40. The vertically aligned longitudinal leading portion 40 has a vertical placement 110 such that it is substantially aligned vertically with the passenger car energy management structure 25. During a simulated front longitudinal impact event, the bumper-to-bumper over-ride/under-ride is minimal. The passenger car energy management structure 25 longitudinal elements continue crushing, minimizing the light truck over-ride of passenger car energy management structure 25.

Simulations used in the development of the present invention were conducted utilizing a large scale SUV model and a medium size passenger car model. The masses of the modeled SUV and car were 3600 Kg and 1800 Kg respectively. A closing speed of 83 Km/h was achieved by imposing one half of closing speed upon each vehicle in a front longitudinal impact event. For full overlap front longitudinal impact event, the longitudinal center-lines of the vehicles were made collinear before the impact event. The present invention was useful in controlling the final post-impact distance between cowl structures on each vehicle. Cowl structures are known in the art and support components such as the windshield and steering column. FIG. 1 shows the general locations of cowl structure 55 of passenger car 10 and cowl structure 65 of light truck 5. The present invention is also useful for controlling the dash intrusion distances resulting from front longitudinal impact. In simulations where only vehicle-to-vehicle geometry is accounted for, i.e. where only the vertical alignment of the leading portion 40 of frame 50 is accounted for, the vertically aligned configuration of FIG. 3 shows farther cowl 55-to-cowl 65 distances following front longitudinal impact, as compared to the prior art configuration of FIG. 2. Also, the vehicle dash intrusion distances resulting from front longitudinal impact were reduced.

Yet another measurement of front longitudinal impact is the body pulse measured at the rocker component 80 that supports a seat at the B-pillar 85 of passenger car 10. Rocker components 80 are known in the art, with the general location of a rocker component 80 being shown in FIG. 1. In a simulation where only the vehicle-to-vehicle geometry is accounted for, i.e. where only the vertical alignment of the leading portion 40 is accounted for, the peak values of the passenger car 5 and light truck 10 body pulses generally did not change. However, the energy is absorbed earlier during the front longitudinal impact event, which concludes earlier, and has a shorter overall time span.

Figure 4:
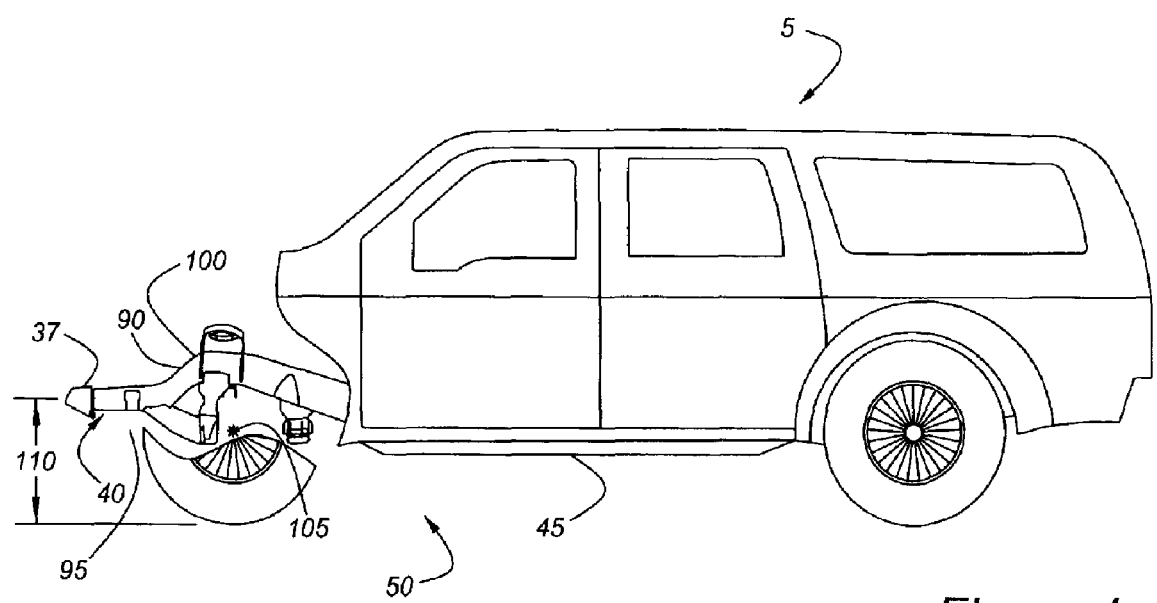
FIG. 4 is a lateral view of an embodiment of a light truck with an improved light truck frame.

FIG. 4 illustrates a light truck vehicle 5 including an embodiment of an improved light truck frame 50 with opposing longitudinal frame rails 45 according to the present invention. Each frame rail 45 has a vertically aligned longitudinal leading portion 40 with a vertical placement 110 selected to substantially align with a passenger car energy management structure at a height commonly associated with mid-sized passenger vehicles. In this embodiment, each frame rail 45 includes a S-contoured section 90 that is contoured downward and forward in front of the front axle 105.

Figure 5:
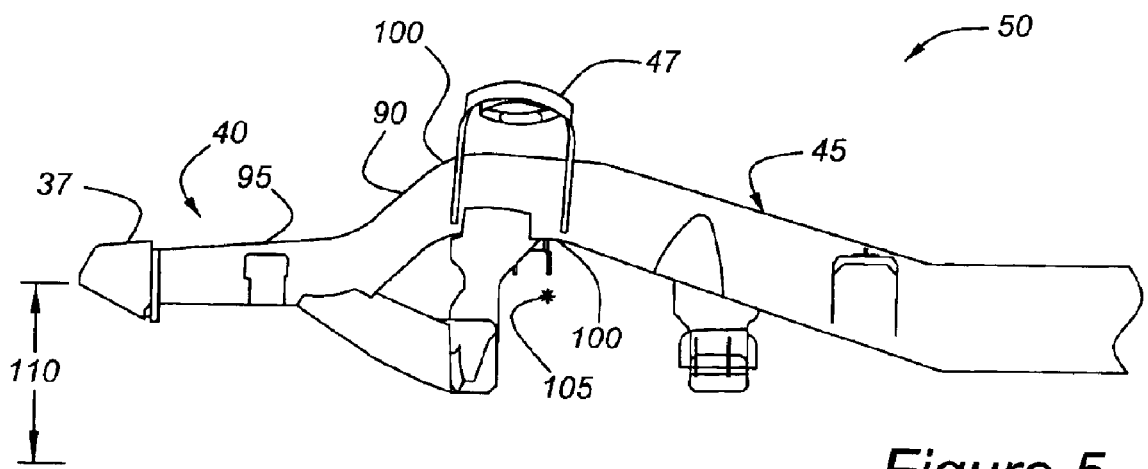
FIG. 5 is a lateral view of an embodiment of an improved light truck frame.

FIG. 5 is a lateral view of a frame rail 45 characterized by a leading portion 40 having a an S-shaped contoured section 90 and frontal section 95, wherein the contoured section 90 is adapted to extend from a position above a front axle 105 then downward and forward, with the frontal section 95 extending forward from the contoured section 90, and with frontal section 95 having a vertical placement 110 defined to substantially align with a vertical placement of a passenger car energy management structure. Frame rail 45 includes a frame rail peak section 100 that peaks at a point above the front axle 105, and the contoured section 90 is adapted to be contoured downward from the frame rail peak section 100 and forward in front of the front axle 105. Frontal section 95 extends forward substantially horizontally from contoured section 90.

Figure 6:
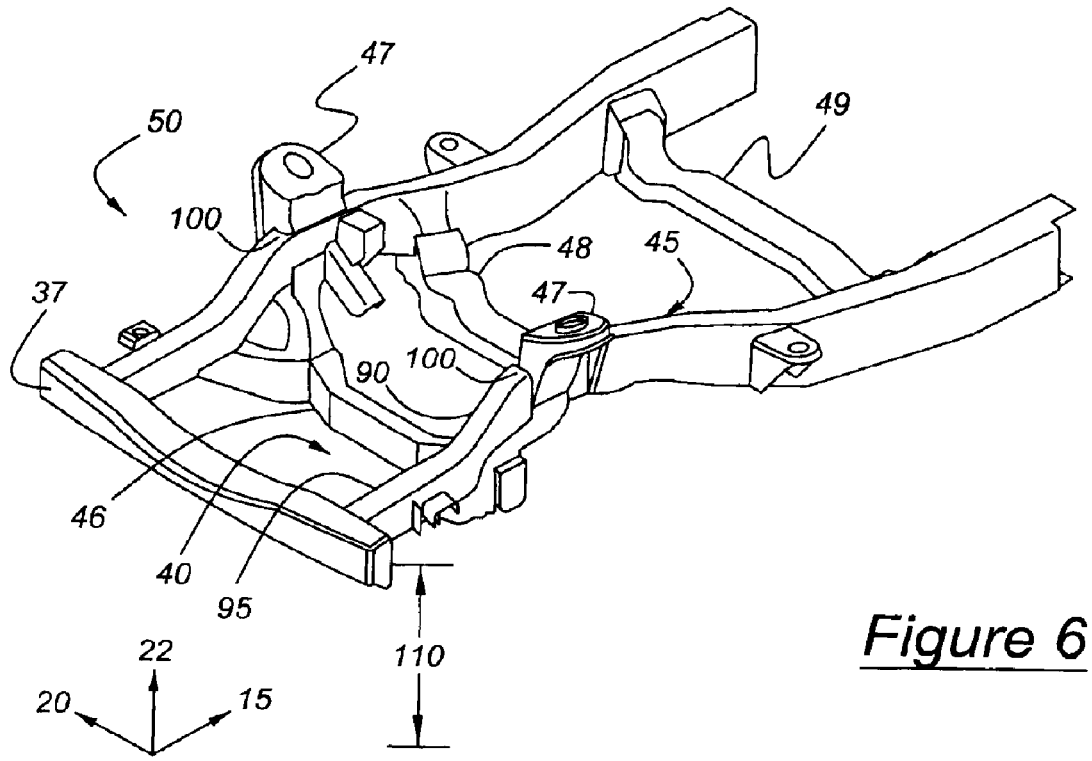
FIG. 6 is a perspective view of an embodiment of an improved light truck frame.

FIG. 6 is a perspective view of an embodiment of the improved light truck frame 50 having opposing frame rails 45 with vertically aligned leading portions 40 with vertical placement 110 defined to substantially align with a passenger car longitudinal energy management structure. Those skilled in the art will appreciate in view of this disclosure that placement 110 is achieved by properly specifying not only the dimensions of frame 50, but also the dimensions of the mounting provisions of axle 105, as well as the particular wheel and tire combination fitted to the vehicle.

The embodiment of FIG. 6 also includes a bumper 37, a front cross member 46, a spring tower 47 located on the frame rail portion having the frame rail peak section 100, a middle cross member 48 and a rear cross member 49.

Yet another measure of front longitudinal impact event is the calculated deformation internal energy of the finite element model of a vehicle. In simulations where only the vertical alignment of the leading portion 40 of the light truck frame rail 45 is accounted for, the passenger car components absorb more calculated deformation internal energy when the longitudinal leading portion 40 of the light truck frame rail 45 is substantially aligned with the components of a passenger car energy management structure 25, for instance the longitudinal frame rails of a passenger car energy management structure, as compared when the longitudinal leading portions 40 of the light truck frame rails 45 are not aligned with longitudinal components of a passenger car energy management structure 25.

It is desirable that each vehicle share the impact energy to improve vehicle to vehicle compatibility in a front longitudinal impact. As earlier described, historically vehicles were tested by crashing the vehicle into a rigid fixed barrier. This lead to stiffer front ends for a light truck than that of passenger cars.

Figure 7:
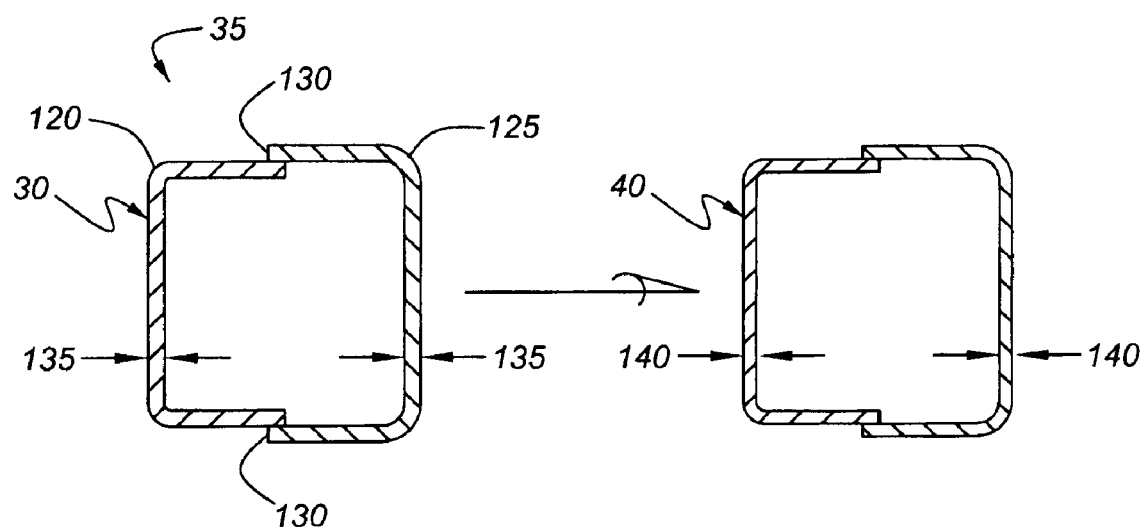
FIG. 7 is a cross-sectional view of one embodiment of an improved light truck frame.

FIG. 7 illustrates an exemplary cross sectional view of an improved frame rail 45 in which at least the leading portion 40 of the improved frame rail 45 is geometrically softened by reducing the thickness, commonly referred to as the gauge, of the light truck frame material to be less than the standard gauge 135 of a prior art light truck frame rail 35 that would typically be used for self-protection. Here, the leading portion 40 of the prior art rail includes a left side 120, a right side 125 and a center weld 130. According to one embodiment, the reduced gauge 140 of said leading portion 40 is reduced to be in the range of about twenty percent less than that of standard gauge 135 of a prior art light truck frame rail 35. According to one embodiment, a reduced gauge 140 dimension in the range of about of 4.8-5.6 mm of mild steel material may be used in place of a standard gauge dimension 135 in the range of about 6-7 mm typically used in light truck applications for self-protection.

Figure 8:
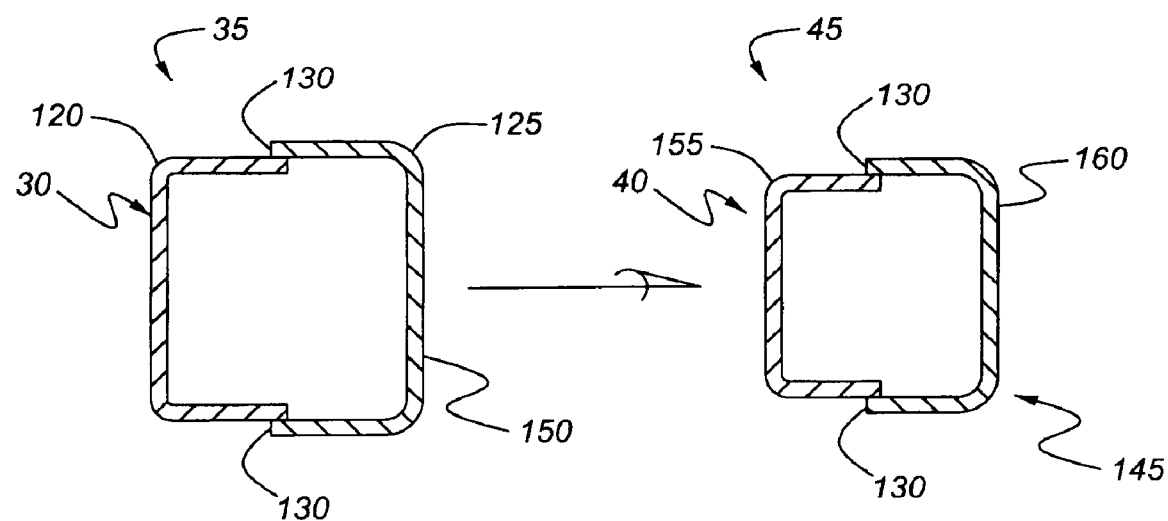
FIG. 8 is a cross-sectional view of an embodiment of the improved light truck frame.

FIG. 8 illustrates an exemplary cross sectional view of a leading portion 40 which is geometrically softened by providing a reduced cross section 145 having a reduced size such that the cross section has less axial strength in a front longitudinal impact than would be used to provide for self-protection. The frame rail may include a left side 120, a right side 125 and a center weld 130. The figure also provides an exemplary cross section of a prior art frame rail 35 that would typically be used for self-protection. According to one embodiment, a reduced channel cross section 145 provides twenty-percent less axial strength in a front longitudinal impact than a standard cross section 150 that would be used to provide for self-protection.

According to one embodiment, at least the leading portion 40 may be materially softened to increase capacity for absorption of impact energy by the light truck frame by utilizing a lower strength material having a lower material yield strength than would typically be used in a prior art frame rail for self-protection. According to one embodiment, the lower material yield strength is selected to be in the range of about twenty percent lower than would typically be used in a prior art frame rail for self-protection. For instance, according to one embodiment, a mild steel may be used with a yield strength in the range of about 200-300 MPa yield in place of mild steel with yield strength values in the range of about 400-500 MPa as would typically used in prior art light truck frame designs for self-protection.

The present invention also provides for a method for improving impact compatibility during vehicle impacts between light truck 5, and passenger car 1 0. Referring now to the components in the various figures, the method includes the steps of providing a light truck frame architecture comprising opposing longitudinal frame rails 45, providing each frame rail 45 with at least a leading portion 40 vertically placed to substantially align with a passenger car energy management structure 25, wherein the vertical placement of the leading portion 40 is selected to direct impact energy to a passenger car 10 energy management structure 25, improving vehicle-to-vehicle compatibility in the event of a front longitudinal impact with passenger car 10.

According to one embodiment, the method includes providing said leading portion 40 with a geometrically softened configuration to provide for increased capacity of absorption of impact energy by light truck frame 50. This may include providing leading portion 40 with a reduced material thickness, 140 such that the material thickness, commonly referred to as the gauge, is less than the standard material thickness 135 of a prior art light truck frame rail 35 that would typically be used for self-protection, in order to provide for increased capacity for absorption of impact energy by the light truck frame 50. According to one embodiment, this may include providing frame 50 material with a reduced gauge 140 in the range of about twenty-percent less than the standard gauge 135 typically used for self-protection. According to one embodiment, the reduced gauge 140 dimension may be provided in the range of about of 4.8 to 5.6 mm of a mild steel material, and may be used in place of a standard gauge dimension 135 in the range of about 6-7 mm typically used in light truck applications for self-protection.

According to one embodiment, the step of providing said leading portion 40 with geometric softening may include providing the leading portion 40 with a reduced cross section 145 having a reduced size such that the cross section has less axial strength in a front longitudinal impact than would be used in a standard cross section 150 that would typically be used for self-protection. According to one embodiment, the reduced cross section 145 is a channel cross section with a left side 155, a right side 160 and a weld 130. According to one embodiment, the reduced channel cross section 145 provides twenty-percent less axial strength in a front longitudinal impact than a standard cross section 150 that would be used to provide for self-protection.

According to one embodiment, the method may include the step of providing said leading portion 40 materially softened to increase capacity for absorption of impact energy by the light truck 5 by utilizing a lower material yield strength lower than would typically be used for self-protection. This may comprise providing said leading portion 40 with material having a yield strength in the range of about twenty-percent lower than would typically be used for self-protection. According to one embodiment, a mild steel may be used with a yield strength in the range of about 200-300 MPa yield in place of mild steel with yield strength values in the range of about 400-500 MPa as would typically used in prior art light truck frame designs for self-protection.

According to one embodiment, the method may further comprise providing each frame rail 45 with a leading portion 40 having a contoured section 90 and frontal section 95 when viewed in a lateral direction, wherein the contoured section 90 is adapted to extend from a position above a front axle downward and forward, and the frontal section 95 extends forward from the contoured section 90 substantially horizontally, the frontal section 95 of the leading portion has the vertical placement 110 defined to substantially align with a vertical placement of a passenger car 10 longitudinal energy management structure 25. According to one embodiment, the contoured section 90 may have an S-type shape when viewed in the lateral direction from a point between frame rails 45.

Although the present invention has been described in connection with particular embodiments thereof, it is to be understood that various modifications, alterations, and adaptations may be made by those skilled in the art without departing from the spirit and scope of the invention. It is intended that the invention be limited only by the appended claims.

What is claimed is:

1. A light truck vehicle, comprising:
a light truck frame comprising opposing longitudinal frame rails each having at least a leading portion with a vertical placement defined to substantially align with a passenger car longitudinal energy management structure, wherein the vertical placement of at least a segment of said leading portion of the light truck frame rails is lowered with respect to the remainder of said leading portion and selected to direct impact energy to a passenger car longitudinal energy management structure, thereby improving vehicle-to-vehicle compatibility in the event of a front longitudinal impact with a passenger car, and wherein each frame rail is characterized by the leading portion having a contoured section and frontal section when viewed from the lateral direction, wherein the contoured section is adapted to extend from a position above a front axle downward and forward and the frontal section extends forward and substantially horizontally from the contoured section, with the frontal section having the vertical placement defined to substantially align with a vertical placement of a passenger car energy management structure.

2. The vehicle of claim 1, wherein a portion of said frame is geometrically softened to increase the capacity for the absorption of impact energy by the light truck frame.

3. The vehicle of claim 2, wherein said leading portion of said frame is geometrically softened by reducing the material thickness of the frame material to be less than typically used for self-protection, to provide for increased absorption of impact energy by the light truck frame.

4. The vehicle of claim 3, wherein the gauge of said leading portion is reduced to be in the range of about twenty percent less than typically used for self-protection.

5. The vehicle of claim 2, wherein said leading portion of said frame is geometrically softened by reducing the cross section dimension of the leading portion such that the reduced cross section has less axial strength in a front longitudinal impact than would be used to provide for self-protection, providing for increased capacity for absorption of impact energy by the light truck frame.

6. The vehicle of claim 5, wherein said leading portion of said frame has in the range of about twenty-percent less axial strength in a front longitudinal impact than would be used to provide for self-protection, providing for increased capacity for absorption of impact energy by the light truck frame.

7. The vehicle of claim 1, wherein said leading portion is materially softened to increase capacity for absorption of impact energy by the light truck frame by utilizing a lower strength material having a lower material yield strength than that material typically used for self-protection.

8. The vehicle of claim 7, wherein the lower material yield strength is selected to be in the range of about twenty percent lower than typically used for self-protection.

9. The vehicle of claim 1 wherein the frame rail includes a peak section that is adapted to peak at a point above a front axle, with the contoured section extending from the peak section downward and forward and being characterized by an S-type shape when viewed in a lateral direction from a point between the light truck frame rails.

10. A method for improving vehicle-to-vehicle compatibility in a frontal vehicle impact between a light truck vehicle and a passenger car, comprising:
providing a light truck frame architecture comprising opposing longitudinal frame rails; and
providing each frame rail with a leading portion having a frontal section vertically placed to substantially align with a passenger car energy management structure, wherein the frontal section vertical placement is lowered and selected to direct impact energy to a passenger car energy management structure, improving vehicle-to-vehicle compatibility in the event of a front longitudinal impact with a passenger car, with said leading portion having a contoured section and a frontal section, wherein the contoured section is adapted to extend from a position above a front axle downward and forward, and the frontal section extends forward from the contoured section, with the frontal section having the vertical placement defined to substantially align with a vertical placement of a passenger car energy management structure.

11. The method of claim 10 further comprising the step of:
providing said leading portion with a geometrically softened configuration to provide for increased capacity of absorption of impact energy by the light truck frame.

12. The method of claim 11, wherein the step of providing said geometrically softened leading portion comprises providing said leading portion with a reduced material gauge, thereby providing increased capacity for absorption of impact energy by the light truck frame, with the gauge being reduced to be less than the gauge that would typically be used for self-protection in a light truck frame rail.

13. The method of claim 12, wherein the step of providing the leading portion with a reduced gauge comprises providing the light truck frame material with a gauge reduced in the range of about twenty-percent.

14. The method of claim 11, wherein the step of providing said leading portion to be geometrically softened comprises providing the leading portion with a reduced cross section to provide increased capacity for absorption of impact energy by frame, with the reduced cross section having reduced axial strength in a front longitudinal impact than would typically be used for self-protection in a light truck frame rail.

15. The method of claim 14, wherein the reduced cross section is reduced to have an axial strength in a front longitudinal impact in the range of about twenty-percent less than a cross section that would typically be used for self-protection in a light truck frame rail.

16. The method of claim 10 further comprising material softening of said leading portion, so as to increase the capacity of the leading portion to absorb impact energy, by utilizing a lower strength material having a lower material yield strength.

17. The method of claim 16 wherein said lower strength material comprises material having a yield strength which is about 20 percent lower than the yield strength of material that would typically be used for self-protection in a light truck frame rail.

* * * * *